United States Patent
Dueser et al.

(10) Patent No.: US 10,318,893 B2
(45) Date of Patent: Jun. 11, 2019

(54) DYNAMIC IN FLIGHT SEAT MANAGEMENT

(71) Applicant: Airbus Operations GmbH, Hamburg (DE)

(72) Inventors: Gerd Dueser, Hamburg (DE); Frank Quatmann, Hamburg (DE)

(73) Assignee: AIRBUS OPERATIONS GMBH, Hamburg (DE)

( * ) Notice: Subject to any disclaimer, the term of this patent is extended or adjusted under 35 U.S.C. 154(b) by 1115 days.

(21) Appl. No.: 14/459,823

(22) Filed: Aug. 14, 2014

(65) Prior Publication Data

US 2015/0051927 A1 Feb. 19, 2015

(30) Foreign Application Priority Data

Aug. 14, 2013 (EP) .................................... 13180459

(51) Int. Cl.
```
G06Q 10/02      (2012.01)
G06Q 50/30      (2012.01)
G06Q 30/08      (2012.01)
G06Q 50/14      (2012.01)
H04N 21/214     (2011.01)
G01C 23/00      (2006.01)
```

(52) U.S. Cl.
CPC .............. *G06Q 10/02* (2013.01); *G06Q 50/30* (2013.01); *G01C 23/00* (2013.01); *G06Q 30/08* (2013.01); *G06Q 50/14* (2013.01); *H04N 21/2146* (2013.01)

(58) Field of Classification Search
CPC ........ G06Q 10/02; G06Q 30/08; G06Q 50/14; G06Q 50/30; H04N 21/2146; G01C 23/00
See application file for complete search history.

(56) References Cited

U.S. PATENT DOCUMENTS

| | | | | |
|---|---|---|---|---|
| 6,474,599 B1 * | 11/2002 | Stomski | ................ | B64C 1/1469 109/68 |
| 8,493,240 B1 * | 7/2013 | Carrico | ................ | G08G 5/0021 340/945 |

(Continued)

FOREIGN PATENT DOCUMENTS

| | | |
|---|---|---|
| DE | 102005030075 A1 | 12/2006 |
| GB | 2134292 A | 8/1984 |

(Continued)

OTHER PUBLICATIONS

Jenner, Gillian. "Selling the Seat". Airline Business; London vol. 29, Issue 3 (Mar. 2013), 32-33,35 (Year: 2013).*

(Continued)

*Primary Examiner* — Kevin H Flynn
*Assistant Examiner* — Brian A Tallman
(74) *Attorney, Agent, or Firm* — Lorenz & Kopf (57) ABSTRACT

A system and a method for dynamic in flight seat management of an aircraft are provided. The system comprises an on board memory unit for storing the current booking status of the seats of the aircraft. Furthermore, the system comprises an output unit for providing the current booking status to a user and an input unit for receiving requests from a user to change the booking status. Therein, the system is adapted to change the booking status in real-time during the flight. In this way, passengers can book a time-limited upgrade during the flight.

12 Claims, 4 Drawing Sheets

(56) References Cited

U.S. PATENT DOCUMENTS

| | | | |
|---|---|---|---|
| 2003/0069789 A1* | 4/2003 | Gathman | G06Q 10/02 |
| | | | 705/14.64 |
| 2003/0158762 A1* | 8/2003 | Wu | B64D 11/0007 |
| | | | 705/5 |
| 2006/0173781 A1* | 8/2006 | Donner | G06Q 10/02 |
| | | | 705/50 |
| 2008/0100474 A1* | 5/2008 | Briski | H04L 67/12 |
| | | | 340/945 |
| 2009/0187640 A1 | 7/2009 | Delia et al. | |
| 2010/0076826 A1* | 3/2010 | Bayne | G06Q 30/0229 |
| | | | 705/14.3 |
| 2010/0146184 A1 | 6/2010 | Redford et al. | |
| 2010/0224727 A1* | 9/2010 | Bauer | B64D 11/0015 |
| | | | 244/118.5 |
| 2011/0178891 A1* | 7/2011 | Charriere | G06Q 10/02 |
| | | | 705/26.2 |
| 2011/0205089 A1* | 8/2011 | Knoop | G01R 31/008 |
| | | | 340/963 |
| 2012/0191490 A1 | 7/2012 | Delia et al. | |
| 2014/0108121 A1* | 4/2014 | Norton | G06Q 10/02 |
| | | | 705/14.35 |

FOREIGN PATENT DOCUMENTS

| | | |
|---|---|---|
| GB | 2176035 A | 12/1986 |
| JP | 2006221254 A | 8/2006 |
| WO | 2011061710 A1 | 5/2011 |

OTHER PUBLICATIONS

European Patent Office, Extended European Search Report dated Feb. 3, 2014 for European Patent Application No. EP 13 18 0459.3.
European Patent Office, European Search Report for European Patent Application No. EP 14 18 0838 dated Jun. 5, 2015.

* cited by examiner

DYNAMIC IN FLIGHT SEAT MANAGEMENT

CROSS REFERENCE TO RELATED APPLICATION

This application claims priority to European Patent Application No. 13 180 459.3 filed Aug. 14, 2013, which is incorporated herein by reference in its entirety.

TECHNICAL FIELD

The technical field relates to dynamic in flight seat management. Particularly, the technical field relates to a system and a corresponding method for dynamic in flight seat management. Moreover, the technical field relates to a use of the system for dynamic in flight seat management in an aircraft.

BACKGROUND

Today the procedure of seat management in vehicles such as airplanes is static after boarding of the passengers. Usually, the passengers book and pay for a seat on the airplane several days or weeks in advance, i.e. before the flight. The booking status is stored e.g. on a computer of the airline and is checked during boarding of the passengers. After the boarding, the current booking or occupancy status may be printed out and handed to the on board crew.

If the higher classes such as business class or first class are not fully occupied a passenger e.g. from the economy class may be upgraded. The upgrade usually may happen during check-in or boarding of the passengers. Therein, for example a frequent flyer may be upgraded for the duration of the whole flight.

After the boarding is completed the on board crew manages the occupancy of the passengers based on a static system. For example, the chosen menu such as a vegetarian menu is assigned to passengers based on the print out of the booking status handed down to the on board crew after boarding. If a passenger wishes to change his/her seat, he/she may call a member of the on board crew via a communication system known e.g. from DE 10 2005 030 075 A1. However, a relocation of the passengers during the flight is not provided for and would cause additional work for the on board crew, such as a manual change of the booking situation on the print out.

In addition, other objects, desirable features and characteristics will become apparent from the subsequent summary and detailed description, and the appended claims, taken in conjunction with the accompanying drawings and this background.

SUMMARY

Thus, there may be a need for a possibility to provide an enhanced seat management during the flight.

According to one of various aspects of the present disclosure a system for dynamic in flight seat management of an aircraft is presented. The system comprises an on board memory unit, an output unit and an input unit. The on board memory unit is adapted for storing the current booking status of the seats of the aircraft. The output unit is adapted for providing the current booking status to a user. The input unit is adapted for receiving requests from users to change the booking status. Furthermore, the system is adapted to change the booking status in real-time during the flight.

According to one of various aspects of the present disclosure a system for dynamic in flight seat management of an aircraft is presented. The system comprises an on board memory unit, an output unit, an authorization unit, a payment unit and an input unit. The on board memory unit is adapted for storing the current booking status of the seats of the aircraft. The output unit is adapted for providing the current booking status to a user. The input unit is adapted for receiving requests from users to change the booking status. Furthermore, the system is adapted to change the booking status in real-time during the flight.

In an example the system for dynamic in flight seat management may comprise an authorization unit or a passenger authorization unit. The authorization unit and in one example, the passenger authorization unit may be connected to the input unit and provides the possibility of a passenger authorization. The authorization unit may allow for a unique passenger authorization, i.e. only the passenger has the privilege to make predefined amendments in the dynamic in flight seat management system. In other words the passenger is unambiguously identified. The authorization unit may comprise a right management device in order to control the type of amendments that each individual passenger can make. In another example the dynamic in flight seat management system may also comprise an authentication unit which is adapted to identify a passenger and link the passenger to a certain user profile stored in the authorization unit.

Furthermore, in one example the system for dynamic in flight seat management can comprise a payment unit that is connected to the input unit or integrated into the input unit. The payment unit may be adapted to process payment actions such as credit card bookings or paying bills. The payment unit may be further adapted to clear a booking action after verifying the credit statement of a passengers account. The passenger's account can be a prepaid account, a credit account or an online bank account that could be accessed via an online connection and/or an offline connection.

In other words, an idea of the present disclosure might be seen in providing quick seat change possibilities for the passengers of an aircraft during the flight. The dynamic change of the booking status is enabled by transmitting the booking status after or during boarding to a memory unit on board of the aircraft and by designing the memory unit in such a way that the information concerning the booking status may be manipulated in real-time. For example, this enables a temporary upgrade system which is available in flight only.

The dynamic in flight seat management system allows for an enhancement of the comfort of the passengers. With the seat management system the passengers of the aircraft may be offered additional comfort for a certain time during the flight. E.g. a two hour-rent of a bed in a quiet sleeping zone may be offered. Furthermore, a business class upgrade for a regular economy class passenger may be offered. The passenger may order this additional comfort items on demand whenever he/she requires it, depending on the availability and during the cruse flight.

Moreover, the dynamic in flight seat management system allows for a better service during the flight, as the on board crew has access to the current and constantly updated booking status of the seats. A further advantage of the dynamic in flight seat management system may be seen in an additional revenue for the airline. The seats which would have stayed empty or would have been filled up with frequent flyers at no extra charge may now be rented by passengers.

The dynamic in flight seat management system may be a permanent part of the airplane. Furthermore, the dynamic in flight seat management system may be integrated into and/or connected to existing on board systems such as the Cabin Management System (CMS) or the In-Flight Entertainment System (IFES). The on board memory unit may for example be a read and write memory. Particularly, the on board memory unit may e.g. comprise a random access memory (RAM).

The on board memory unit receives by cable or via a wireless connection the booking status from an on ground booking system. The booking status is stored on the on board memory and may be changed or updated e.g. at any time during the flight. For instance the initial or the final booking status is stored on the on board memory and may be changed or updated e.g. at any time during the flight. Thus, the on board memory unit may comprise a modifiable database. Additionally, a dynamic booking algorithm may be stored on the on board memory unit. The booking algorithm may be employed to change the booking status.

The reception or transmission of the booking status can take place during or after boarding of the passengers. In an example the final booking status will be received or transmitted after the boarding process has been completed. In another example the initial booking status will be received or transmitted after the boarding process has been completed. The reception or transmission of the booking status is triggered by a change of a boarding status. For example the completion of the boarding process is indicated by a boarding status wherein the boarding status is changed from the status "boarding ongoing" to the status "boarding completed". For instance the boarding process may be defined as the time period during which the passengers enter the airplane and take their seats. Boarding may be completed via a cabin crew announcement, a communication and/or the closing of the aircraft's door. That means that when the boarding process is completed a cabin crew announcement, a cabin crew communication, a cabin crew notification and/or any other indication is provided. Alternatively and/or in addition to the indication the airplane door is closed. In other words, a boarding status may be determined by a boarding status determining device. A boarding status determining device may be any device triggering a change of the boarding status. The boarding status determining device may be a switch connected to the CMS. That switch for example may be combined with the device that is used for making the indication. In another example the booking status determining device may be a switch integrated into the airplane door and connected to the dynamic in flight seat management system wherein the switch can switch a boarding status from the "boarding ongoing" status to the "boarding completed" status when the airplane door is closed. The boarding status can be stored on the on board memory or in a register to which the boarding status determining device has access.

The booking status may represent the availability of free seats. Furthermore, the booking status may contain more detailed information such as which seats are occupied by whom and at what time they are free. The booking status may be modified by requests of a passenger or a member of the on board crew. The current booking status indicates the latest occupation situation of the cabin. In an example the current booking status indicates the latest occupation situation of the cabin in real time.

Therein, the current booking status is provided to a user, such as a passenger or a member of the on board crew, via an output unit. The information that is visible or changeable by the user may depend on a user profile. Thus, a passenger allocated to a passenger profile or to a user profile may not see the same information as the cabin crew member allocated to a crew member profile. The administration of the profiles and access rights may be handled by the authorization unit and/or by the authentication unit. In an example the passenger profile prevents accessing passengers' personal details, such as name, flight status, birthdates, birthdays, etc so that these details will not be shown to the passengers if the passenger is not authorized.

The output unit may for example be a Human Machine Interface (HMI) of the airplane such as a display, i.e. a screen. In one example, the output unit may be part of an In-flight Entertainment System. The In-flight Entertainment System may for example comprise a personal television display embedded on the back of each passenger seat. These personal television displays may be used as output units for providing the current booking status to the passengers e.g. on demand. Alternatively, a tablet PC or a Smartphone may be used as output unit. Such mobile devices can be handed out by the airline operator at the gate or in the aircraft or they are used as Bring-Your-Owned-Devices, which means they are carried and owned by the passengers. These mobile devices may need to be configured by an application (App) in order to enable the communication to the aircraft management server. The output unit is connected to the on board memory unit by cable or wirelessly.

Moreover, the system comprises an input unit. The input unit may be a peripheral hardware device such as a keyboard, a mouse a joystick or a touch screen. In an example the input unit may be connected to the authorization unit. This authorization unit can guarantee a unique authorization and/or an individual authorization of each individual passenger towards the dynamic in flight seat management system. In one example the authorization unit comprises the application (app) and/or communicates with the application (app). The application may be downloadable on a mobile device or the application may be installed on an onboard device such as an IFES. The onboard device may be mounted on a seat. The authorization unit and in one example, the input unit and/or the payment unit may comprise a ticket scanning device, a fingerprint scanning device, an individual pin pad, which may be provided to each passenger with the ticket, a credit card reader and/or a frequent flyer card reader for authorizing the passenger having the credentials like the ticket or credit card. The authorization unit and/or the authentication unit in an example may also link a seat number allocated to the passenger with the corresponding passenger profile or user profile. This combination of a seat number and passenger authorization may help to prevent any kind of misuse of the dynamic in-flight seat management. In other words, the authorization unit and/or the authentication unit is adapted to link a passenger profile to a seat number allocated to this passenger so that only a passenger authorized by the appropriate credentials and sitting on the appropriate seat with the relevant seat number can access the booking details of that passenger. Thus, for example the output unit linked to a particular seat number is activated for any operation related to a certain passenger profile. For instance each output unit may be mounted to a seat and may be addressed by an individual identifier such as an IP (Internet Protocol) address or an MAC (Medium Access Control) address. The link between output unit and seat may be made in the dynamic in flight seat management system. Therefore, it may be prevented that a passenger sitting on another seat in the airplane can access a passengers booking status even if he has the credentials. The dynamic in flight seat management system may be adapted to control and administrate each individual content of the output unit individually for each passenger and change the corresponding content to a new seat's output unit if the passenger changes the seat. The content may include the booking status as well as the content used for the IFE system so that a passenger changing the seat can continue with the content used before changing the seat.

The input unit provides an interactive interface between the user and the on board memory unit. For this purpose the input unit is connected to the on board memory unit by cable or wirelessly. Therein, the input unit may be provided as part of the output unit. For example, the output unit may be designed as a tablet PC, a Smartphone or a touch screen, embedded in the passenger seat or a handheld unit. The input unit may be an integral part of the output unit, i.e. the input unit and the output unit form a combined unit. The system may comprise several input and output units. In one example, a separate input and/or output unit is provided for each passenger. Furthermore, several input and/or output units may be provided for the members of the on board crew. The input unit may also be combined with a credit card reader to allow the payment of the temporary upgrade, or even frequent flyer points could be used for the payment. In an example the payment function may also be handled by the application. In the latter case the credentials such as the card number and/or the pin etc. are handled by the application (app). In that case the app may offer an online payment function.

In other words, a HMI for passengers may be provided which serves as an input unit as well as an output unit. The HMI, the input unit and/or the output unit may be allocated to a certain seat number and/or to a certain passenger profile. For example, the HMI for passengers may be an IFE which is installed into a seat. Alternatively, the HMI for passengers may be a portable device such as a tablet PC. Furthermore, a HMI for the cabin crew provides also access to the on board memory unit. For example, the HMI for the cabin crew members may be integrated into the CMS. The HMI for the cabin crew is not installed into a seat but may be arranged in a cabin crew area.

The input unit is adapted to control signals to the on board memory unit. In one example, a user or a member of the on board crew may send a request to the on board memory unit to change the booking status. A change of the booking status may correspond to a reservation of a higher classed seat for a certain time period of the flight. I.e. a passenger may upgrade himself/herself e.g. to first class for one hour. The request of the passenger is transmitted to the on board memory unit. In the on board memory unit the request may be checked for acceptability. For example, a booking status algorithm may check whether the desired seat is actually free for the requested time period and whether in this time period a relocation of passengers is possible. Therein, a relocation of passengers may be prohibited for example for one hour after takeoff and for one hour before landing.

If the request is acceptable, the booking status is changed on the on board memory unit. As mentioned above the change of the booking status may imply the reservation of a desired seat for a certain time period. Furthermore, the original seat of the passenger to be relocated is marked or tagged as free for the same period of time.

The booking status is changed in real-time during the flight. That means that immediately after the request of the user and possibly after a confirmation of the acceptability of the request by the system, the booking status is altered on the on board memory unit. The quick changes of the booking status are possible due to the fact that the whole dynamic in flight seat management system is located on or within the aircraft and thus does not require interaction with external devices.

According to an exemplary embodiment of the present disclosure the booking status is changeable in temporal sub-units of the flight duration. I.e. an upgrade may be limited to a certain fraction of the complete flight time. In other words, a passenger may for example buy an upgrade to first class for three hours of a nine hours flight. For this purpose, the current booking status may be presented to the users divided into sub-booking units. For example, the current booking status may be presented in form of a timetable. The temporal sub-units may for example be about 30 minutes, about one hour or about two hours.

For example, a business class seat which is free after boarding of the passengers may be booked by six different passengers each for a period of one hour during a flight of eight hours. In this way, the comfort of the users may be enhanced on demand and the revenue of the airline may be increased due to the dynamic in flight seat management system.

According to an exemplary embodiment of the present disclosure the booking status is changed automatically according to the requests from the users via the input unit. Automatically may imply that no additional user interaction, such as a confirmation from a member of the on board crew member, is necessary. Thus, the booking status may be changed immediately after the request of the user, if the request corresponds to certain parameters possibly checked by a booking algorithm. Alternatively, the on board crew may manually confirm the request of a passenger via a further input unit.

According to an exemplary embodiment of the present disclosure the input unit functionally interacts with the on board memory unit for changing the booking status. A functional interaction may imply that the user may directly or indirectly change the booking status stored on the on board memory unit via the input unit. Contrary to the teachings of the present disclosure, in known systems such as in In-flight Entertainment Systems this kind of functional interaction between a passenger operated system and a general airplane system is not implemented. In other words in contrast to the present disclosure, in known systems such as in In-flight Entertainment Systems this kind of functional interaction between a passengers operated system and a general cabin management system may not be implemented. According to an aspect of the present disclosure a functional interaction between a passengers operated system and a general cabin management system can be implemented.

According to an exemplary embodiment of the present disclosure the on board memory unit is part of a Cabin Management System. In this way, an existing on board system may be advantageously used to implement the dynamic in flight seat management system. The Cabin Management System may be an on board system which is further adapted to control several parameters within the passenger cabin. Such parameters may for example be temperature, air conditioning and light. Furthermore, the Cabin Management System may control communication means for the flight crew.

According to an exemplary embodiment of the present disclosure the input unit is a Human Machine Interface (HMI), a personal computer such as a tablet PC or a Smartphone. Therein, the HMI may for example be part of an IFES and/or part of the CMS. The IFES may be used as input and/or output unit by passengers and the CMS may be used by the cabin crew. Alternatively, the passengers as well as the cabin crew may use the IFES as input and/or as output unit. The authorization unit and/or the payment unit may be integrated in the input unit or in the output unit of the IFES. The output unit may be identical to the input unit. It may be advantageous to use existing components and systems of the cabin of the airplane as input units. In this way no additional components have to be installed and weight may be saved. The existing systems and components may be changed to allow access to the on board memory. Alternatively, it may be convenient for the passengers to use own PCs or Smartphones with which they are familiar. For this purpose an algorithm such as an app for a Smartphone may be provided for download before the flight or on board of the airplane. In an example the dynamic in flight seat management system may comprise a server for downloading the algorithm and/or the app.

According to an exemplary embodiment of the present disclosure the on board memory unit is functionally connected to a Flight Management System (FMS). The Flight Management System is adapted to inhibit or prevent the changing of the booking status. In an example the FMS may be adapted to prevent changing of the booking status during certain flight phases.

The Flight Management System may for example control a direct communication between the pilot and the Cabin Management System. For example, announcements of the pilot to the passengers may be communicated via the Flight Management System. Moreover, the Flight Management System may have access to information concerning the flight such as flight altitude and flight duration. Therein, the Flight Management System can e.g. automatically prevent the changing of the booking status for example by interrupting the functional connection between the on board memory unit and the input units. This may happen for security reasons. For example, the security of the passengers may be increased by inhibiting the changing of the booking status and the relocation of passengers during takeoff and landing phases. A flight may be divided into different flight phases. An example of an order of different flight phases after boarding of the passengers are taxi, take off, cruise, landing, taxi. The current flight phases may be automatically identified by the CMS via nautical data or aviation data such as GPS data, flight speed, altitude derived from the airplane navigation system. The nautical data or the aviation data can be requested by the dynamic in flight management system from the CMS or directly from the airplane navigation system. Weather forecast, dictating heavy turbulences, could be automatically used to limit the seat change possibilities In other words the actual flight phase can be determined by automatically accessing the CMS or the airplane navigation system and processing the desired CMS data, nautical data or aviation data such as GPS (Global Positioning System) data, flight speed and/or altitude or weather details. In another example the actual flight phase is defined by the pilot. The dynamic in flight seat management system can comprise a flight phase determining device for either manually or automatically determining the flight phase. In case of manually inputting the actual flight phase the pilot can operate the flight phase determining device by using a switch or the like that can be turned into a position corresponding to a certain flight phase. In case of automatically determining the flight phase the flight phase determining device accesses the physical information like GPS data, flight speed, attitude etc. from the CMS, from the FMS or from the airplane navigation system and calculates the corresponding flight phase. For accessing the nautical data the dynamic in flight seat management system can be adapted for communicating with the CMS or the airplane navigation system. In both cases of determining the flight phase the information of the actual flight phase is provided to the dynamic in flight seat management system to be considered for the decision to allow or to prevent seat changes. Also a prediction of the relevant flight phase might be made to manage a schedule of seat changes for future time points.

According to an exemplary embodiment of the present disclosure the on board memory unit is functionally connectable to an external memory unit. The current booking status of the seats is transferred from the external memory unit to the on board memory unit during and/or after boarding. Therein, the external memory unit e.g. may be part of an external aircraft communication management system.

According to an exemplary embodiment of the present disclosure the system provides a confirmation to the user via the output unit after changing the booking status. In this way, the passenger may be informed that his request is accepted and he/she may change his/her seat at the requested time.

According to one of various aspects of the present disclosure, a method for dynamic in flight seat management of an aircraft is provided. The method comprises the following: storing the current booking status of the seats of the aircraft in an on board memory unit during flight; providing the current booking status to a user via an output unit; receiving a request from a user to change the booking status during flight via an input unit; dynamically changing the booking status on the on board memory unit in real-time during the flight.

The method can further comprise comparing the request of the user with certain parameters e.g. by a booking algorithm and changing the booking status only if the request corresponds to the predetermined parameters. The method can also comprise a passenger authorization via an authorization unit and an upgrade payment via a payment unit.

According to an exemplary embodiment of the present disclosure the method further comprises transferring the current booking status of the seats from an external memory unit to an on board memory unit during and/or after boarding of the users.

According to one of various aspects of the present disclosure a use of the system described above in an aircraft is presented.

It has to be noted that embodiments of the invention are described with reference to different subject matters. In particular, some embodiments are described with reference to method type claims whereas other embodiments are described with reference to device or system type claims. However, a person skilled in the art will gather from the above and the following description that, unless otherwise notified, in addition to any combination of features belonging to one type of subject matter also any combination between features relating to different subject matters is considered to be disclosed with this application. The features may be combined providing synergetic effects that are more than the simple summation of the features.

A person skilled in the art can gather other characteristics and advantages of the disclosure from the following description of exemplary embodiments that refers to the attached drawings, wherein the described exemplary embodiments should not be interpreted in a restrictive sense.

BRIEF DESCRIPTION OF THE DRAWINGS

The various embodiments will hereinafter be described in conjunction with the following drawing figures, wherein like numerals denote like elements, and wherein.

DETAILED DESCRIPTION

The following detailed description is merely exemplary in nature and is not intended to limit the present disclosure or the application and uses of the present disclosure. Furthermore, there is no intention to be bound by any theory presented in the preceding background or the following detailed description.

Figure 1:
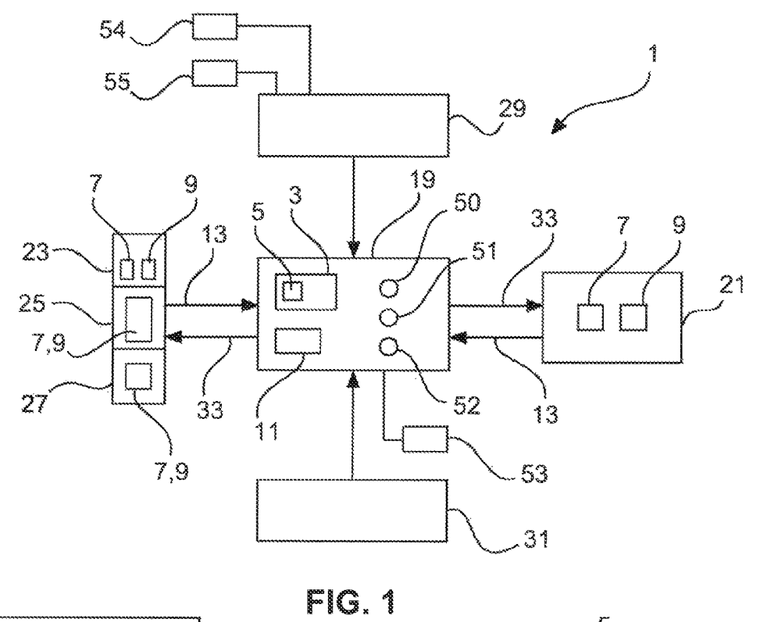
FIG. 1 shows schematically a dynamic in flight seat management system according to an exemplary embodiment of the present disclosure.

In FIG. 1, a system 1 for dynamic in flight seat management of an aircraft is shown schematically. The system 1 comprises an on board memory unit 3 for storing the current booking status 5 of the seats of the aircraft. Furthermore, the on board memory unit 3 can be used for storing the boarding status or a passenger profile as well as information about the different flight phases. The on board memory unit 3 is for example a read and write memory such as RAM. In the embodiment shown in FIG. 1 the on board memory unit 3 is designed as part of a Cabin Management System 19. In other words, the dynamic in flight seat management system 1 can be integrated into an existing on board system. The Cabin Management System 19 may furthermore control several parameters such as temperature, air conditioning and light within the passenger cabin.

The system 1 further comprises an output unit 7 for providing the current booking status 5 to a user. The user may be a passenger of the airplane or a member of the on board crew. The output unit 7 may for example be a Human Machine Interface 21 of the airplane such as a display. Additionally or alternatively, the output unit 7 may be part of an In-flight Entertainment System 23. Furthermore, a tablet PC 25 or a Smartphone 27 may be used as an output unit 7. In the example shown in FIG. 1 several output units 7 are provided. One of the output units 7 is designed as part of a Human Machine Interface 21 for flight attendants, i.e. for members of the flight crew. For the passengers several further output units 7 are provided. Therein, the passengers may use their own Smartphones 27, own or airline provided handheld devices such as tablet PCs 25 and the In-Flight Entertainment System 23 as output devices 7. For access to the system via tablet PC 25 or Smartphone 27 the system 1 and/or the In-flight Entertainment System 23 can provide a wireless interface such as Bluetooth or WLAN (Wireless Local Area Network).

Moreover, the dynamic in flight seat management system 1 comprises an input unit 9. The input unit 9 may be a peripheral hardware device such as a keyboard, a mouse a joystick or a touch screen. Therein, the input unit 9 may be provided in the same device as the output unit 7. Furthermore the system 1 has an authorization unit 50, an authentication unit 52 and/or a payment unit 51 which units are connected with the input unit 9. The units 50, 51, 52 can be integrated into the CMS 19 and can be remotely accessed from a corresponding input/output device 21, 23, 25, 27. The units 50, 51, 52 can in another example be directly integrated into the relevant input/output device e.g. the HMI 21, IFE 23 or IFES 23, Tablet PC 25 or Smartphone 27. The authorization unit 50 can also comprise a dedicated seat management input device such as a scanner, a QR (Quick Response)-Code reader, a pin pad, a fingerprint scan, a fingerprint scanner or a corresponding app (application). In an example the dedicated seat management input device is realized on the relevant input/output device 21, 23, 25, 27. The dedicated seat management input device is not shown in FIG. 1. The authorization unit 50 and/or the authentication unit 52 transfer the passenger input data towards the CMS 19, in particular to a processing unit of the CMS. During an authentication process and/or during an authorization process the processing unit checks that a passenger who is operating the system 1 is authorized to make the desired seat change request or seat change requests. For example the processing unit verifies the provided credentials against a user profile. The credentials can be provided via the dedicated seat management input device. The authentication process and/or the authorization process can comprise a payment clearing process for billing purposes. The billing can be handled by the payment unit 51 which is connected to the authorization unit 50 and to the payment unit 51. The payment clearing process uses similar algorithms as the authentication process and/or the authorization process to verify the user rights of a passenger. The payment unit 51 could be a standard handheld that is provided by an IFES controller for paying content in the in flight entertainment system. The payment unit 51 can also be a credit card reader. If the output unit 7 is designed as a Smartphone 27 or a tablet PC 25 the touch screen of the device may be used at the same time as input unit 9 and as output unit 7. If the output unit 7 is designed as a display of an In-Flight Entertainment System 23 or as a Human Machine Interface 21, then the input unit 9 can be provided in the form of a mouse or a joystick. The input units 9 transfer user inputs such as requests 13 for upgrades to the Cabin Management System 19 and particularly to the on board memory unit 3. For passenger owned devices a computer program or an Application or App may be provided for download by the airline.

The input units 9, authorization unit 50, authentication unit 51, payment unit 52 and the output units 7 are connected to the on board memory unit 3 by cable or wirelessly. This implies a functional interaction between the Cabin Management System 19 and further on board systems such as the Human Machine Interface 21 and the In-Flight Entertainment System 23 which is not present in known airplanes.

Furthermore, the system 1 may comprise a booking algorithm 11 which may be stored on the on board memory unit 3. In the embodiment shown in FIG. 1, the booking algorithm 11 is stored on a separate unit within the Cabin Management System 19. The booking algorithm may be employed to change the current booking status 5 and/or to check whether the requested changes correspond to security requirements and are allowable.

A passenger may book and pay a seat on the airplane several days or weeks before the flight. Then, the booking status 5 is stored e.g. on a computer also denoted as an external memory unit 31 of the airline which may for example be located on ground at the airport. During or after boarding the on board memory unit 3 is connected to the external memory unit 31 and the current booking status 5 of the seats is transferred to the on board memory unit 3. The final booking status or the initial booking status will be received immediately after the boarding is completed. In other words, the final booking status of the ground system may be the initial booking status of the system (1) for dynamic in flight seat management. The boarding's completed status will be archived due to a cabin crew announcement/communication or the closing of the airplane door. The boarding status can be detected by a boarding status determining device 53. After the boarding the current booking status 5 is presented to the users via the output unit 7. The passenger will authorize his upgrade request via the authorization unit 50 and/or via the authentication unit 52 in combination with the payment through the payment unit 51. The payment process can be executed after authentication and/or authorization processes of the user. The user can issue a request 13 to change the booking status 5 via the input unit 9. If the request 13 is approved e.g. by the booking algorithm 11 or by a member of the on board crew, the system changes the booking status 5 on the on board memory unit 3 in real-time.

In this way the dynamic in flight seat management system 1 allows to offer an additional comfort to a passenger for a certain time during the flight. For example, a passenger may book or rent a bed in a quiet sleeping zone or an economy class passenger can book an upgrade to business class or to first class e.g. for the time period in which a meal is served. The passenger can order this extra comfort items on demand depending on the availability of the seats. These upgrades and relocations can be offered for booking during the whole duration of the flight.

The dynamic in flight seat management system 1 combines a couple of tasks and possibly connects existing systems of the airplane to each other to get a complete system 1 that works with quick change possibilities during the flight. For example, directly after the boarding prior to the closing of the flight, the dynamic in flight seat management system 1 may offer the free seats to the passengers via the output units 7. The free seats may be offered for a temporary upgrade. The temporary upgrade service may be available in flight only, so that there is no conflict with the on-ground booking status.

The dynamic in flight seat management system 1 works in real-time to handle the booking status 5, i.e. the reservation for each individual free seat and give directly a feedback 33 to confirm the seat booking or to decline the passenger request 13. Therein, the dynamic in flight seat management system 1 is hosted in an aircraft located management system, e.g. the Cabin Management System 19 or alternatively in the In-Flight Entertainment System 23. The dynamic in flight system 1 manages the unique authorization and payment of each passenger. In other words, the in flight system 1 manages the individual authorization and payment of each passenger. This means that each passenger can individually manage their or his seat booking and make payments for the booking by an individual authorization to the system. In order to prevent misuse of the booking system, the booking data can only be accessed from an IFES that is dedicated to the seat where the individual passenger is supposed to sit.

By enabling a dynamic and real-time change of the booking status 5 during the flight temporally limited upgrades and relocations of passengers during the flight are possible. In this way an additional revenue possibility for the airline and an increase in the comfort of the passengers is possible. This is made possible by the real-time information flow from the passenger through the Cabin Management System 19 with the dynamic booking process and the real-time feedback to the passenger.

As shown in FIG. 1 a further independent system, namely the Flight Management System 29 may be functionally connected to the on board memory unit 3 and/or to the Cabin Management System 19. The Flight Management System 29 can control a direct communication between the pilot/cabin crew and the Cabin Management System 19. The Flight Management System 29 can e.g. automatically prevent the changing of the booking status 5 for example by interrupting the functional connection between the on board memory unit 3 and the input units 9. By inhibiting the changing of the booking status 5 and the relocation of passengers during certain phases of the flight such as takeoff and landing, the security of the passengers may be increased. For determining the actual flight phase the Flight Management System 29 can comprise a flight phase determining device 54 that either be manually operated by a pilot or automatically derive the actual flight phase from a airplane navigation system 55 of the FMS 29. Thus, the flight phases can be automatically identified by the CMS 19 and/or by the FMS 29 by using nautical data and/or aviation data.

Figure 2:
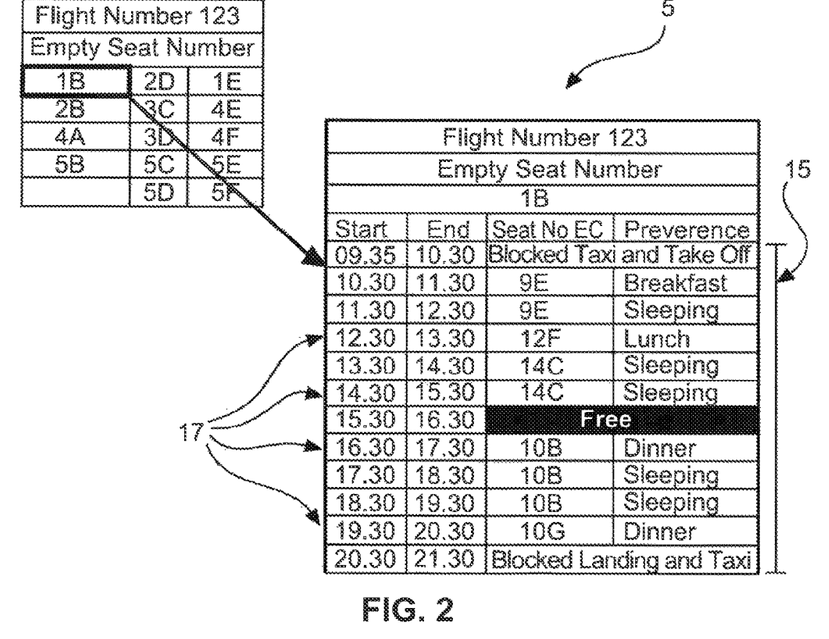
FIG. 2 shows schematically a booking status represented on an output unit in table form.

In FIG. 2 a booking status 5 is shown as it may be represented on an output unit 7. The booking status 5 is represented in form of a table. For example, the table can be interactive. As shown in the left part of FIG. 2 each empty seat of the business class can be listed on the output unit 7 of a passenger. Therein, in the first line of the table the flight number may be mentioned. Furthermore, in the second line of the table the contents of the table may be described for example as "Empty seat number".

When the passenger selects a seat a detailed schedule for the selected seat is displayed on the output unit 7. This is shown in the right part of FIG. 2. Therein, both views shown in FIG. 2 may be displayed simultaneously or subsequently on the output unit 7.

In the example shown in FIG. 2, seat 1B is selected. As shown in the right part of FIG. 2 the booking status 5 for this particular seat is presented to the user after selecting the seat. Therein, the flight duration 15 is divided into temporal sub-units 17. In the shown example the sub-units 17 correspond each to one hour e.g. from 10:30 a.m. to 11:30 a.m. The representation of the booking status 5 comprises four columns in the shown example. In a first column the starting time of a sub-unit 17 is shown. In a second column the ending time of a sub-unit 17 is shown. In a third column it is shown whether the seat is occupied or free for the temporal sub-unit 17 defined in the first and second columns. If the seat is occupied for a certain temporal sub-unit 17 the original seat number of the passenger who has booked the upgrade may be shown. In a forth column the preference of the passenger who booked the temporal upgrade may be displayed. A preference may for example imply the purpose of the upgrade. For example, possible preferences may be breakfast, sleeping, lunch or dinner. The booking algorithm 11 may be designed in such a way as to display the described information on the booking status 5 to a member of the on board crew. The information displayed to a passenger may be restricted to the first to third column. In the third column only the terms "free" or "occupied" may be shown to a passenger. The dynamic in flight seat management system 1 is adapted to compose the layout of the representation of the booking status 5 dependent on a user profile. For example different columns are shown to different users. For instance column 4 relating to the preferences may only be visible for user being authenticated as a crew member.

As may be seen in FIG. 2, a certain time period in the beginning and at the end of the flight can be blocked from being booked e.g. via the Flight Management System 29. In this way the security of the passengers may be enhanced as no relocations of passengers take place during takeoff and landing phases and turbulences. The information about the flight phases or the blocked periods can be provided by the FMS 29, the CMS 19 and/or by the navigation system 55 in combination with a flight phase determining device 54.

Figure 3:
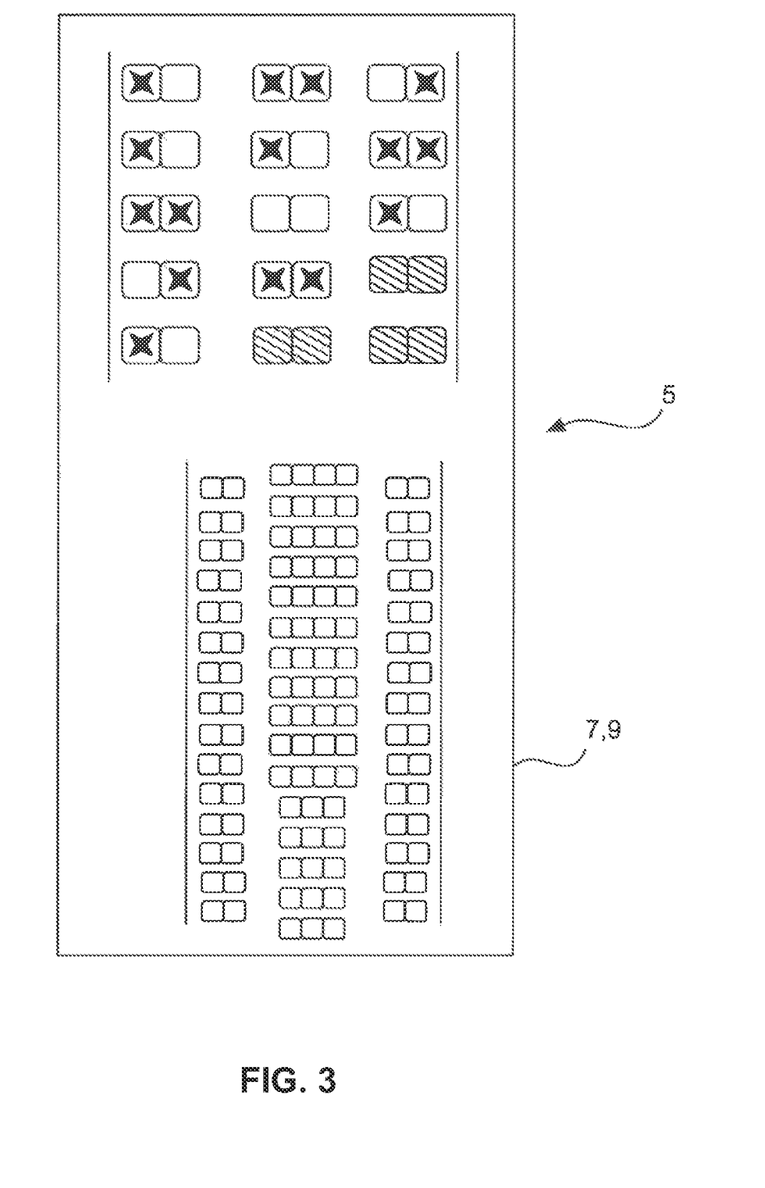
FIG. 3 shows schematically a further representation of the booking status on an output unit in graphic form.

In FIG. 3 a further representation of the booking status 5 on an output unit 7 is shown. Contrary to FIG. 2 the booking status 5 is presented in graphic form. The booking status 5 may be represented in this form e.g. on a Flight Attendant or board crew member output unit 7 such as a Human Machine Interface 21. In the shown example, in the economy class which is presented in the lower part of FIG. 3, 123 seats are provided. Moreover, in the upper part of FIG. 3, 30 business class seats are provided.

All seats of the economy class are occupied, i.e. booked for the whole duration 15 of the flight. This may be denoted by not marking the seats at all as shown in the lower part of FIG. 3. Alternatively, the permanently occupied seats may be denoted by crosses as shown in the upper part of FIG. 3. Therein, in the business class shown in the upper part of FIG. 3, 15 seats are occupied and 15 seats are free. The free seats may be denoted by a labeling or a tag such as e.g. a circle or a square. The labeling or marking may be colored. A user may select the free seats e.g. by touching the screen or by using a mouse.

Figure 4:
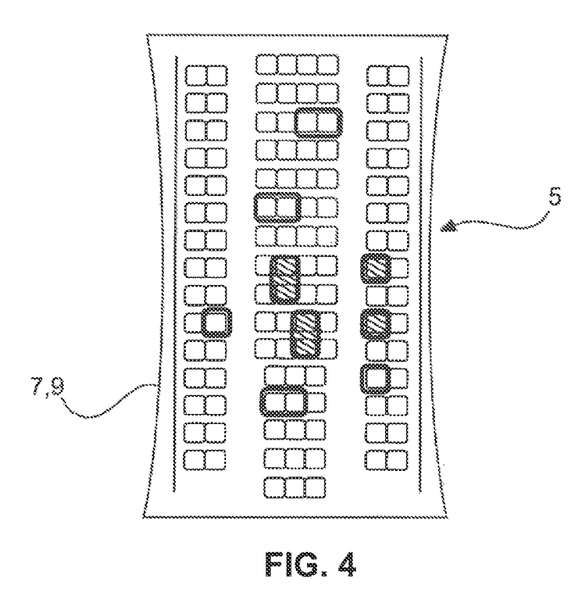
FIG. 4 shows schematically a change of the booking status as compared to the representation in FIG. 3.

In FIG. 4, the lower part of the booking status 5 shown in FIG. 3 is presented. Therein, the booking status 5 is changed, i.e. updated, as compared to the representation in FIG. 3. In the example shown in FIG. 4, some passengers of the economy class used the dynamic in flight seat management system 1 for an upgrade to business class. FIG. 3 shows the free seats in economy class which may now be rented e.g. to increase the private space of a passenger in economy class. Therein, the seats which are not occupied during the whole flight may be denoted by a first color or shading and seats which are only free for a limited amount of time, i.e. for a temporal sub-unit 17 of the flight duration 15 may be denoted by as second color or shading.

Figure 5:
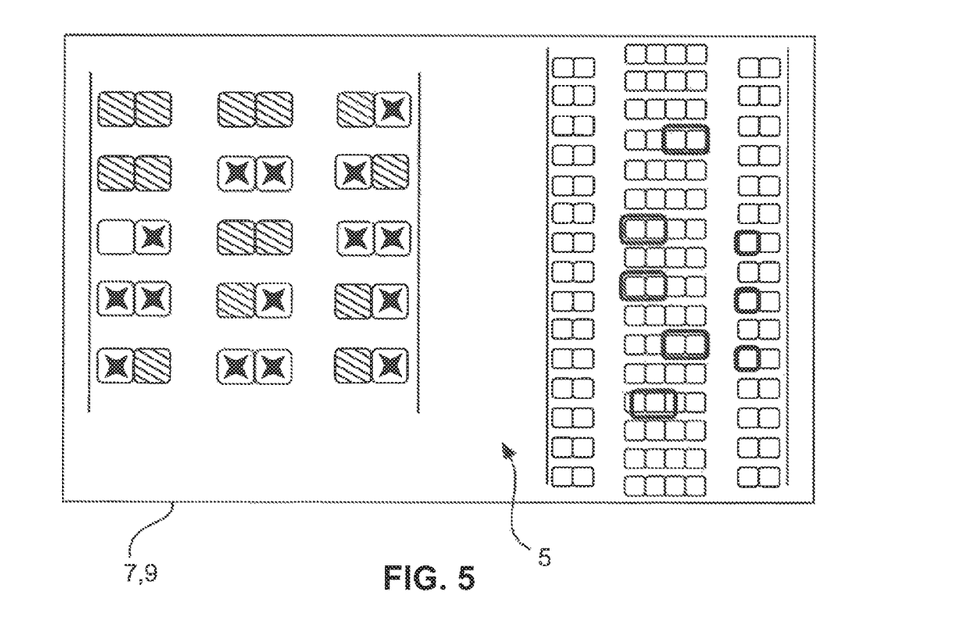
FIG. 5 shows schematically an alternative layout of the representation of the booking status on an output unit.

In FIG. 5, an alternative layout of the representation of the booking status 5 on the output unit 7 is shown. Therein, contrary to the example of FIG. 3 the booking status 5 of the business class and the economy class are presented not below but beside each other. The shaded seats in business class on the left side of FIG. 5 are available for a temporal upgrade. The framed or marked seats in economy class may be booked in addition to the already occupied seat by a passenger who occupies the seat next to the free seat.

Figure 6:
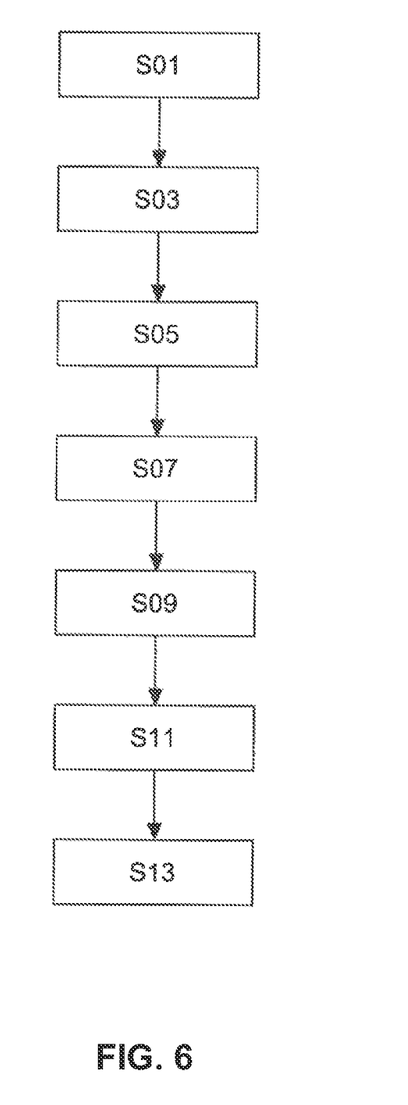
FIG. 6 shows a flow chart of a method for dynamic in flight seat management according to an embodiment of the present disclosure.

In FIG. 6, a flow chart of a method for dynamic in flight seat management is shown. At S01 the current booking status 5 of the seats from an external memory unit 31 is transferred to an on board memory unit 3 during or after boarding. At S03 the current booking status 5 of the seats of the aircraft is stored in an on board memory unit 3 during the flight. Furthermore, at S05 the current booking status 5 is provided to a user via an output unit 7. This can comprise the authorization of the passenger via the authorization unit 50.

At S07 a request 13 from a user to change the booking status 5 is received via an input unit 9. Therein, the input unit 9 is adapted to control signals to the on board memory unit 3. The request 13 of the passenger is transmitted to the Cabin Management System 19 and in one example, to the on board memory unit 3. In the Cabin Management System 19 or in the on board memory unit 3 the request 13 can be checked for acceptability. Prior the final acceptance of the upgrade request the passenger fulfills the payment via the payment unit 51. In one example, at S09 the request 13 of the user is compared e.g. with predetermined parameters by a booking algorithm 11. For example, a booking algorithm 11 can check whether the desired seat is actually free for the requested time period and whether in this time period a relocation of passengers is possible.

At S11 the booking status 5 on the on board memory unit 3 is dynamically changed in real-time. This happens during the flight. Furthermore, the changing of the booking status 5 only takes place if the request 13 corresponds to the predetermined parameters in S09. At S13 a confirmation 33 is provided to the user via the output unit 7 after the booking status 5 is changed.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the present disclosure in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the present disclosure as set forth in the appended claims and their legal equivalents.

What is claimed is:

1. A system configured to perform dynamic in flight seat management of an aircraft during a flight which is divided into different flight phases, the system comprising:
   an on board memory unit configured to store a dynamically updateable real-time current booking status of a plurality of seats of the aircraft, wherein the current booking status is changeable in temporal sub-units of a duration of the flight;
   wherein the on board memory unit is functionally connectable to an external memory unit;
   wherein the current booking status of the plurality of seats is transferred from the external memory unit to the on board memory unit during boarding;
   an output unit configured to provide the current booking status to a user;
   an input unit configured to receive one or more requests from a user to change the current booking status;
   a boarding status determining device comprising a switch integrated into a door of the aircraft, wherein the switch is configured to trigger a change of the boarding status;
   a flight phase determining device configured to determine an actual flight phase and providing the information of the actual flight phase to a Flight Management System; and
   an authorization unit;
   wherein the on board memory unit of the system is further configured to change the current booking status in real-time during the flight, the on board memory unit is functionally connected to the Flight Management System, and the Flight Management System is configured to inhibit the changing of the current booking status;
   wherein the change of the current booking status is made by requesting the authorization unit;
   wherein the authorization unit is configured to manage rights to control the type of amendments that each individual passenger can make;

wherein the authorization unit is further configured to identify passengers and link passengers to user profiles stored in the authorization unit;

wherein the authorization unit is further configured to link passenger authorization to a corresponding seat number and user profile via user authentication;

wherein the authorization unit is further configured to regulate access and display of booking information only to authenticated passengers who are using an in-flight entertainment system; and wherein the output unit is further configured to, in response to user selection of an empty seat number displayed by the output unit for the current booking status, display a detailed schedule for the selected empty seat number, the displayed detailed schedule comprising:

a plurality of temporal sub-units, each having a respective starting time and a respective ending time;

an indication of whether the selected empty seat number is occupied or free for each of the plurality of temporal sub-units; and,     if the selected empty seat number is occupied for a certain temporal sub-unit of the plurality of temporal sub-units as a passenger upgrade, an original seat number of a passenger who booked the selected empty seat number and certain temporal sub-unit as the upgrade.

2. The system according to claim 1, wherein the current booking status is changed automatically according to the one or more requests from the user via the input unit.

3. The system according to claim 1, wherein the input unit is further configured to functionally interact with the on board memory unit to change the current booking status.

4. The system according claim 1, wherein the on board memory unit is part of a Cabin Management System.

5. The system according to claim 1, wherein the input unit is selected from the group comprising: a Human Machine Interface of the aircraft, a tablet PC, and a Smartphone.

6. The system according to claim 1, wherein the output unit is further configured to provide a confirmation to the user after the current booking status has changed.

7. An aircraft, comprising:

a plurality of seats;

an on board memory unit configured to store a dynamically updateable real-time current booking status of the plurality of seats, wherein the current booking status is changeable in temporal sub-units of a duration of a flight;

wherein the on board memory unit is functionally connectable to an external memory unit that is external to the aircraft;

wherein the current booking status of the plurality of seats is transferred from the external memory unit to the on board memory unit during boarding;

an output unit configured to provide the current booking status to a user;

an input unit configured to receive one or more requests from a user to change the current booking status of one or more of the plurality of seats;

a boarding status determining device comprising a switch integrated into a door of the aircraft, wherein the switch is configured to trigger a change of the boarding status;

a flight phase determining device configured to determine an actual flight phase of the flight which is divided into different flight phases, and further configured to provide the information of the actual flight phase to a Flight Management System; and an authorization unit;

wherein the on-board memory unit is further configured to change the current booking status in real-time during the flight of the aircraft, the on board memory unit is functionally connected to the Flight Management System, and the Flight Management System is configured to inhibit the changing of the current booking status;

wherein the change of the current booking status is made by requesting the authorization unit;

wherein the authorization unit is configured to manage rights to control the type of amendments that each individual passenger can make;

wherein the authorization unit is further configured to identify passengers and link passengers to user profiles stored in the authorization unit;

wherein the authorization unit is further configured to link passenger authorization to a corresponding seat number and user profile via user authentication;

wherein the authorization unit is further configured to regulate access and display of booking information only to authenticated passengers who are using an in-flight entertainment system; and wherein the output unit is further configured to, in response to user selection of an empty seat number displayed by the output unit for the current booking status, display a detailed schedule for the selected empty seat number, the displayed detailed schedule comprising:

a plurality of temporal sub-units, each having a respective starting time and a respective ending time;

an indication of whether the selected empty seat number is occupied or free for each of the plurality of temporal sub-units; and,     if the selected empty seat number is occupied for a certain temporal sub-unit of the plurality of temporal sub-units as a passenger upgrade, an original seat number of a passenger who booked the selected empty seat number and certain temporal sub-unit as the upgrade.

8. The aircraft according to claim 7, wherein the current booking status is changed automatically according to the one or more requests from the user via the input unit.

9. The aircraft according to claim 7, wherein the input unit is further configured to functionally interact with the on board memory unit for changing the current booking status.

10. The aircraft according claim 7, wherein the on board memory unit is part of a Cabin Management System of the aircraft.

11. The aircraft according to claim 7, wherein the input unit is selected from the group comprising: a Human Machine Interface of the aircraft, a tablet PC, and a Smartphone.

12. The aircraft according to claim 7, wherein the output unit is further configured to provide a confirmation to the user after the current booking status has changed.

* * * * *